US011074636B1

(12) United States Patent
Vora

(10) Patent No.: US 11,074,636 B1
(45) Date of Patent: *Jul. 27, 2021

(54) RECOMMENDATIONS BASED ON MINED CONVERSATIONS

(71) Applicant: Amazon Technologies, Inc., Reno, NV (US)

(72) Inventor: Jinesh U. Vora, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/222,287

(22) Filed: Dec. 17, 2018

Related U.S. Application Data

(63) Continuation of application No. 14/192,046, filed on Feb. 27, 2014, now Pat. No. 10,181,146, which is a continuation of application No. 12/783,370, filed on May 19, 2010, now Pat. No. 8,666,980.

(51) Int. Cl.
G06Q 30/06 (2012.01)

(52) U.S. Cl.
CPC .............. *G06Q 30/0631* (2013.01)

(58) Field of Classification Search
CPC ... G06F 16/335; G06F 16/9535; G06Q 30/02; G06Q 50/01; G16H 20/70
See application file for complete search history.

(56) References Cited

U.S. PATENT DOCUMENTS

| 6,466,918 | B1 | 10/2002 | Spiegel |
| 7,165,069 | B1 | 1/2007 | Kahle et al. |
| 7,680,703 | B1 * | 3/2010 | Smith ............ G06Q 10/06 705/26.8 |
| 7,765,130 | B2 * | 7/2010 | McQueen, III ........ G06Q 30/02 705/26.1 |
| 8,010,527 | B2 * | 8/2011 | Denoue ............... G06F 16/9535 707/726 |
| 8,175,989 | B1 | 5/2012 | Gopinath |
| 8,296,392 | B2 | 10/2012 | Green et al. |
| 8,494,897 | B1 | 7/2013 | Dawson |

(Continued)

OTHER PUBLICATIONS

Google AdSense Product Tour, available at http://www.google.com/services/adsense tour/targeting.html, last accessed on Mar. 25, 2010.

(Continued)

*Primary Examiner* — Mark D Featherstone
*Assistant Examiner* — Navneet Gmahl
(74) *Attorney, Agent, or Firm* — Knobbe, Martens, Olson & Bear, LLP

(57) ABSTRACT

This disclosure describes various processes for collecting information about users from sources other than catalog activity data. This information can be used to generate recommendations for users with activity data deficiencies. Some example sources for this supplemental data include collaborative content sites, such as social networking sites. Social networking sites typically allow users to engage in conversations with other users through text, audio, and/or video. Conversation data collected from these sites or from other sources can be analyzed to infer user interests. A recommendation process (or other application) can use the inferred interests to supplement or take the place of catalog activity data.

18 Claims, 6 Drawing Sheets

(56) References Cited

U.S. PATENT DOCUMENTS

| | | | |
|---|---|---|---|
| 8,751,507 B2* | 6/2014 | Kim | G06F 16/335 |
| | | | 707/748 |
| 8,930,204 B1* | 1/2015 | Igoe | G06F 16/9535 |
| | | | 705/2 |
| 10,404,824 B2* | 9/2019 | Korst | G06Q 30/0631 |
| 2002/0010625 A1 | 1/2002 | Smith et al. | |
| 2002/0019763 A1 | 2/2002 | Linden et al. | |
| 2003/0028451 A1* | 2/2003 | Ananian | G06Q 30/02 |
| | | | 705/26.42 |
| 2003/0050916 A1 | 3/2003 | Ortega | |
| 2003/0105682 A1* | 6/2003 | Dicker | G06Q 30/02 |
| | | | 705/26.8 |
| 2005/0071251 A1* | 3/2005 | Linden | G06Q 30/0253 |
| | | | 705/14.54 |
| 2006/0122979 A1* | 6/2006 | Kapur | G06F 16/9535 |
| 2006/0259356 A1* | 11/2006 | Zhang | G06Q 30/0256 |
| | | | 705/14.54 |
| 2008/0119174 A1* | 5/2008 | Farkas | G06Q 30/02 |
| | | | 455/414.1 |
| 2008/0177721 A1* | 7/2008 | Agarwal | G06Q 30/02 |
| 2008/0243632 A1* | 10/2008 | Kane | G06Q 30/02 |
| | | | 705/14.66 |
| 2008/0243637 A1* | 10/2008 | Chan | G06Q 30/02 |
| | | | 705/26.1 |
| 2009/0119173 A1* | 5/2009 | Parsons | G06Q 10/107 |
| | | | 705/319 |
| 2009/0171754 A1* | 7/2009 | Kane | G06F 16/9535 |
| | | | 705/14.53 |
| 2009/0222551 A1* | 9/2009 | Neely | G06F 16/951 |
| | | | 709/224 |
| 2010/0030648 A1* | 2/2010 | Manolescu | G06Q 30/02 |
| | | | 705/14.66 |
| 2010/0042460 A1* | 2/2010 | Kane, Jr. | G06Q 30/02 |
| | | | 705/14.69 |
| 2010/0114946 A1* | 5/2010 | Kumar | G06F 16/9535 |
| | | | 707/770 |
| 2010/0191582 A1* | 7/2010 | Dicker | G06Q 30/02 |
| | | | 705/14.51 |
| 2010/0217757 A1* | 8/2010 | Fujioka | G06Q 10/10 |
| | | | 707/710 |
| 2010/0241498 A1* | 9/2010 | Chung | G06F 16/972 |
| | | | 705/14.5 |
| 2011/0112897 A1* | 5/2011 | Tietzen | G06Q 30/0256 |
| | | | 705/14.25 |
| 2011/0119150 A1* | 5/2011 | Kane, Jr. | G06Q 30/0631 |
| | | | 705/26.7 |
| 2011/0264596 A1* | 10/2011 | Shifflett | G06Q 30/02 |
| | | | 705/319 |
| 2012/0001919 A1* | 1/2012 | Lumer | H04L 67/22 |
| | | | 345/440 |
| 2012/0158552 A1* | 6/2012 | Smith | G06Q 30/0629 |
| | | | 705/27.2 |
| 2012/0278331 A1 | 11/2012 | Campbell et al. | |
| 2013/0268596 A1 | 10/2013 | Nomula | |

OTHER PUBLICATIONS

About Gmail, available at http://mail.google.com/mail/help/about privacy.html, Dec. 2009 (last accessed Mar. 25, 2010).

U.S. Appl. No. 13/485,598, filed May 31, 2012, titled "Multi-Site Based Recommendations", in 45 pages (including specification, drawings, and filing receipt).

\* cited by examiner

RECOMMENDATIONS BASED ON MINED CONVERSATIONS

RELATED APPLICATIONS

This application is a continuation of U.S. application Ser. No. 14/192,046, filed Feb. 27, 2014, which is a continuation of U.S. application Ser. No. 12/783,370, filed May 19, 2010 (now U.S. Pat. No. 8,666,980), the disclosure of which is hereby incorporated by reference in its entirety.

BACKGROUND

A variety of methods are known for detecting behavior-based associations (associations based on user behaviors) between items stored or represented in a database. For example, the purchase histories or item viewing histories of users can be analyzed to detect behavior-based associations between particular items represented in an electronic catalog (e.g., items A and B are related because a relatively large number of those who purchased A also purchased B). See, e.g., U.S. Pat. No. 6,912,505. As another example, the web browsing histories of users can be analyzed to identify behavior-based associations between particular web sites and/or web pages. See, e.g., U.S. Pat. No. 6,691,163 and U.S. Pat. Pub. 2002/0198882.

The detected behavior-based associations are typically used to assist users in locating items of interest. For example, in the context of an electronic catalog, when a user accesses a network resource, such as a web page, that is associated with an item, the resource may be supplemented with a list of related items. This list may, for example, be preceded with a descriptive message such as "people who bought this item also bought the following," or "people who viewed this item also viewed the following." The detected associations may also be used to generate personalized recommendations that are based on the target user's purchase history, item viewing history, and/or other item selections.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

Personalized recommendations can be generated for users based on a user's interactions in an electronic catalog, which can include user purchases and item selections (e.g., page requests). This catalog activity data can provide indications of users' interests, allowing a recommendation system to find items that match or complement these interests. For some users, however, little or no data exists on their purchase and item selection habits. Other users have such data, but the data was generated some time ago and therefore may be less relevant. Existing recommendation systems therefore tend to use other, less effective techniques for recommending items to these users, such as recommending popular items.

This disclosure describes various processes for collecting information about users from sources other than catalog activity data. This information can be used to generate recommendations for users with activity data deficiencies. Some example sources for this supplemental data include collaborative content sites, such as social networking sites. Social networking sites typically allow users to engage in conversations with other users through text, audio, and/or video. Conversation data collected from these sites or from other sources can be analyzed to infer user interests. A recommendation process (or other application) can use the inferred interests to supplement or take the place of catalog activity data.

For purposes of illustration, the processes disclosed herein are described primarily in the context of an electronic catalog system that detects associations between catalog items for the purpose of recommending such items to users of an e-commerce web site. As will be apparent, however, the disclosed processes can also be used in other types of systems, and can be used to recommend other types of items, such as but not limited to web sites, news articles, blogs, podcasts, travel destinations, service providers, other users (e.g., as potential friends in a social network), events, discussion boards, photos and other images, online videos, tagged items, and user-generated lists of items. In addition, the disclosed processes need not be implemented as part of, or in conjunction with, a web site.

As used herein, the term "item" is used interchangeably to refer to an item itself (e.g., a particular product) and to its description or representation in a computer system. As will be apparent from the context in which it is used, the term is also sometimes used herein to refer only to the item itself or only to its representation in the computer system.

II. System Overview

Figure 1:
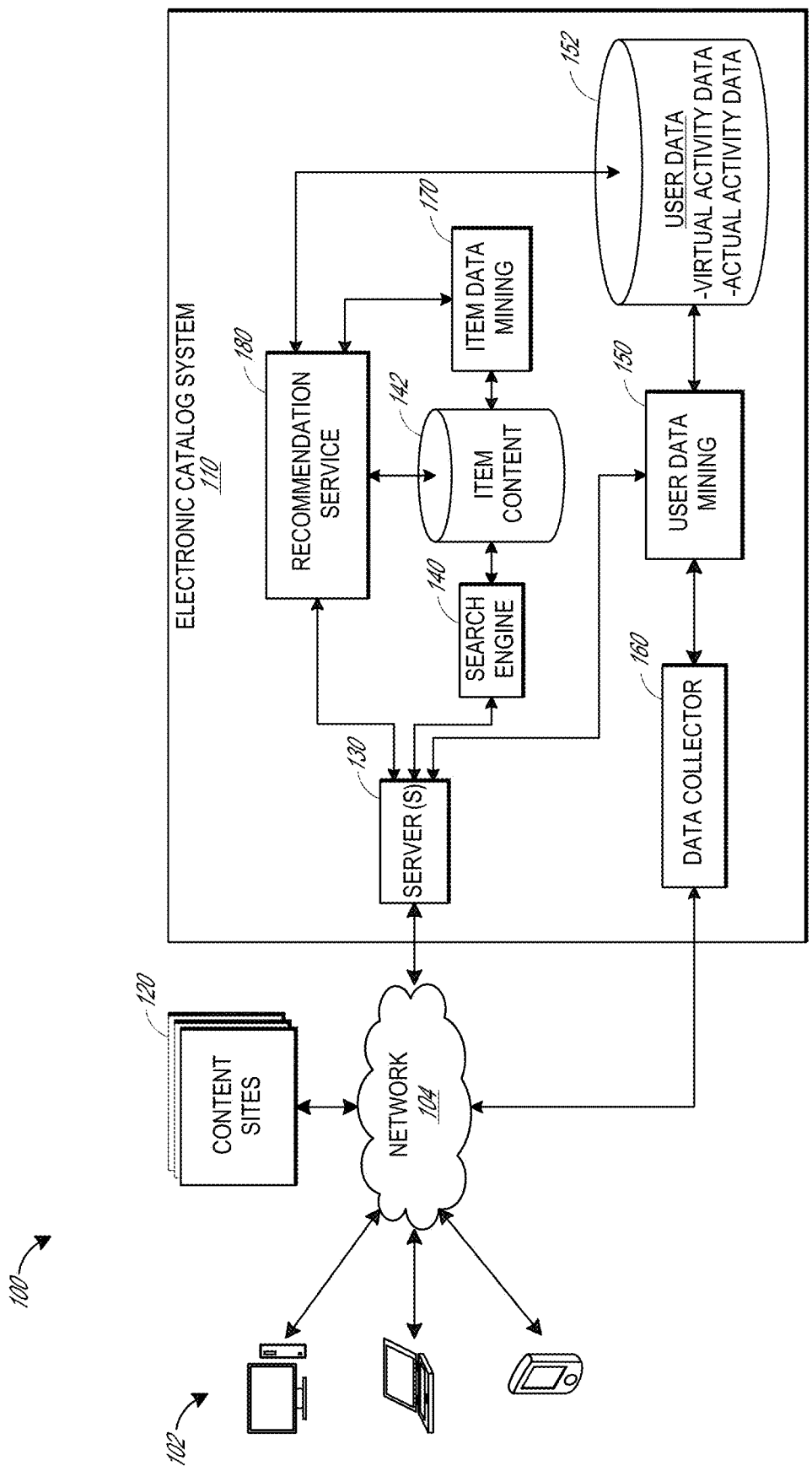
FIG. 1 illustrates an embodiment of a network environment for providing users with access to an electronic catalog system.

FIG. 1 depicts an embodiment of a network environment 100 suitable for providing users with access to an electronic catalog system 110. In the environment 100, users can access the electronic catalog system 110 and content sites 120, such as social networking sites, with user systems 102. The electronic catalog system 110 can collect user conversation data from the content sites 120. The electronic catalog system 110 can analyze this conversation data to infer user interests. The electronic catalog system 110 can then recommend items to users based at least partly on the inferred interests. Thus, in certain embodiments, the electronic catalog system 110 can provide effective recommendations for users that have little or no browsing or purchase experience with the electronic catalog system 110.

The user systems 102 that access the electronic catalog system 110 can include computing devices, such as desktop computers, laptop computers, tablets, personal digital assistants (PDAs), mobile phones, electronic book readers, other wireless handheld devices, set-top or other television boxes, media players, and kiosks, among others. The user systems 102 access the electronic catalog system 110 and the content sites 120 over a network 104, which can be a local area network or a wide area network (such as the Internet).

The electronic catalog system 110 can be implemented with one or more physical servers or computing machines. Thus, each of the components depicted in the electronic catalog system 110 can include hardware and/or software for performing various features. In one embodiment, the electronic catalog system 110 is a web site. Likewise, the content sites 120 can be implemented with one or more physical servers or computing machines and can also be web sites. The content sites 120 can be operated by entities who are different from one another and who are different from an operator of the electronic catalog system 110.

The content sites 120 can include collaborative sites, such as social networking sites, forums, web publishing sites (e.g., blogs), and chat sites, among others. As such, the content sites 120 can provide interactive media for allowing users to communicate with other users. For example, a social networking site 120 or a forum site 120 might include features for users to post textual comments, engage in written conversations, share pictures and other audiovisual media, and the like.

Conversations on the content sites 120 can involve a variety of topics. Some of these topics might mention products that users would like to buy. In certain embodiments, the electronic catalog system 110 can collect data about such conversations and mine the data for references to products and other product-related topics. The electronic catalog system 110 can use this data to improve recommendations, among other uses. As used herein, the term "products" and its derivatives, in addition to having their ordinary meaning, can include anything that can be sold or have a recorded transaction, including services.

In the depicted embodiment, the electronic catalog system 110 includes several components that can be implemented in hardware and/or software. For instance, the electronic catalog system 110 includes one or more servers 130 for receiving and responding to network requests from user systems 102. The one or more servers 130 can include web servers, application servers, or other types of servers. The electronic catalog system 110 also includes a search engine 140 in communication with the one or more servers 130. Users can query the search engine 140 to obtain information about electronic catalog content stored in an item data repository 142.

The electronic catalog content can include information about products and services. In one embodiment, this content is arranged in a hierarchical structure, having items associated with one or more categories or browse nodes in a hierarchy. The electronic catalog system 110 can provide functionality for users to browse the item hierarchy in addition to searching the catalog. Users can select an item represented in the hierarchy or in a list of search results to see more details about an item. In response to a user item selection, the server 130 can provide a catalog page (sometimes called an item detail page) that includes details about the selected item.

The electronic catalog system 110 further includes a user data mining component 140. The mining component 140 can collect catalog activity data, including data about a user's purchase history and browse history. The browse history can include selection actions such as catalog page requests, additions of items to wish lists and shopping carts, user interface events (such as mouse movements), and the like. A user's browse history can also include click stream data. Click stream data can include data on item selections that a user makes during a current browse session. A user's click stream can include selections made by a pointing device (e.g., by clicks or other mouse movements), keyboard (e.g., pressing the "Enter" key on a link), or by some other device. The mining component 140 can store purchase history data and browse history data in the user data repository 152. A recommendation service 180 (described below) can access users' catalog activity data stored in the data repository 152 to generate recommendations for users.

As described above, some users have little or no catalog activity data. For example, new users and infrequent users of the electronic catalog system 110 may have made few purchases, other item selections or limited viewing history. Other users who used the electronic catalog system 110 but are now dormant may have extensive catalog activity data, but this data may be old and therefore less representative of the users' current interests. As such, recommendations generated based on catalog activity data may be less effective at driving new, infrequent, and dormant users to purchase items. Advantageously, in certain embodiments, the electronic catalog system 110 can supplement deficient catalog activity data with activity data collected from the content sites 120. The electronic catalog system 110 can use the collected data in place of or together with catalog activity data to generate recommendations. These recommendations can be more relevant for new, infrequent, and dormant users than recommendations generated based on actual catalog activity data. In addition, in some embodiments, the supplementary activity data collected from the content sites 120 can also be used for other purposes. The display order of search results can be ranked, for instance, according to a user's perceived interests as derived from the supplementary activity data.

The electronic catalog system 110 can collect data from the content sites with a data collector 160. In one embodiment, the data collector 160 accesses the content sites 120 through the network 104 to collect data generated or consumed by users of the content sites 120. The users of the content sites 120 can also be users of the electronic catalog system 110. Accordingly, in one embodiment these users have an account or other relationship with both the electronic catalog system 110 and with one or more content sites 120. Thus, the data collected from the content sites 120 for a certain user can supplement or replace the same user's catalog activity data.

In certain embodiments, the data collector 160 collects conversation data from the content sites 160. Conversation data can include the text or other components of conversations between a target user and one or more other users. These conversations can include textual discussions, forum posts, blog posts, comments to blog posts, chat room text, and the like. Conversations can further include audio/visual material, such as images or video, hypertext links, widget or other application data, and the like. Techniques used by the data collector 160 to collect conversation data are described below with respect to FIG. 2.

Conversation data can be provided by the data collector 160 to the user data mining module 150. The mining module 150 can analyze the conversation data to obtain information about user interests. In one embodiment, the mining module 150 searches the conversation data for references to products and/or product interests. For instance, the mining module 150 can search for references to products that a target user wishes to buy or to purchase as a gift or otherwise generally shows an interest in. The mining module 150 can also search for references to products other users suggested the target user to purchase. Moreover, the mining module 150 can search for references to products that the user already owns, for example, by analyzing the user's purchase history. The mining module 150 can consider these product references as virtual item selections, storing the product references as virtual activity data in the data repository 152. Features for generating this virtual activity data are described in greater detail below with respect to FIG. 3.

A recommendation service 180 included in the electronic catalog system 110 can generate recommendations based on a user's catalog and/or virtual activity data. For instance, the recommendation service 180 can access a user's catalog activity data to determine a user's past catalog item selections. If the user has little or no catalog activity data, the recommendation service 180 can access a user's virtual activity data to determine the user's virtual item selections. In another embodiment, the recommendation service 180 uses both the catalog and virtual activity data to generate recommendations.

The recommendation service 180 can use any of a variety of algorithms for generating recommendations. For instance, the recommendation service 180 can provide any item in the catalog or virtual activity data of a user as a recommendation to that user. The recommendation service 180 can also access data mined by an item data mining component 170 together with the catalog or virtual activity data to generate recommendations. The features of the item data mining component 170 and further features of the recommendation service 180 are described in greater detail below with respect to FIG. 4.

Although not shown, the electronic catalog system 110 can also include features that have been described above with respect to the content sites 120. Thus, for example, the electronic catalog system 110 can also include social networking features. In such embodiments, the data collector 160 can collect conversation data from the content-site portion of the electronic catalog system 110 instead of or in addition to collecting conversation data from the content sites 120. The electronic catalog system 110 can analyze this locally-derived conversation data using the data mining module 150 and can apply the recommendation features described herein to the analyzed results.

Additionally, the processing of the various components of the electronic catalog system 110 can be distributed across multiple machines, networks, and other computing resources. The various components of the electronic catalog system 110 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

III. Virtual Activity Data Generation

Figure 2:
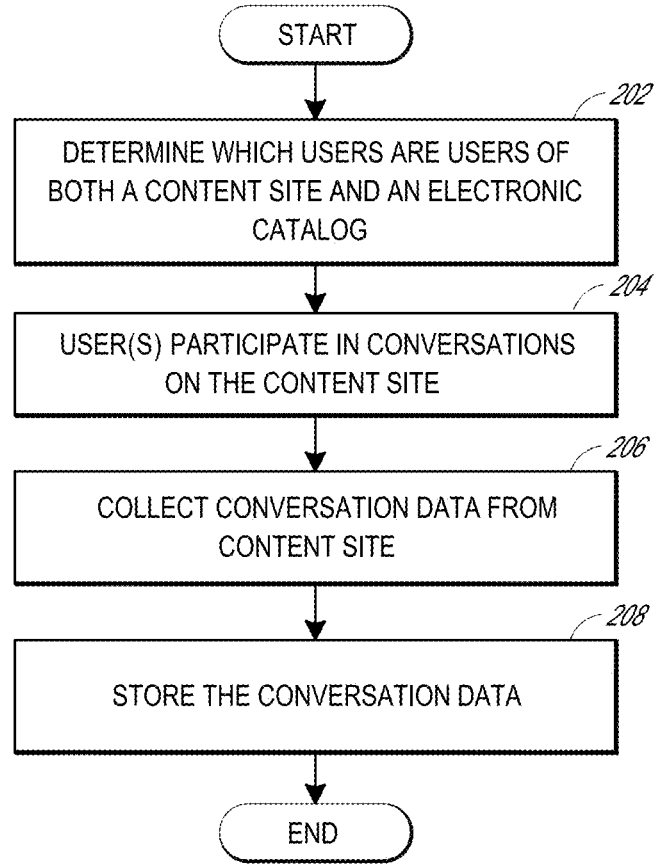
FIG. 2 illustrates an embodiment of a data collection process for accessing conversation data on a content site.

FIG. 2 depicts an embodiment of a data collection process 200 for obtaining conversation data. The data collection process 200 can be implemented by the electronic catalog system 110. For example, the data collector 160 can implement blocks 202, 206, and 208 of the data collection process 200.

As described above, data collected from a content site for a certain user can supplement the same user's catalog activity data. At block 202, it is determined which content site users are also catalog users. Determining which content site users are also catalog users can include detecting and/or creating an association between a user account with the electronic catalog system 110 and a user account with a content site 120. This association between accounts can be stored in computer storage (e.g., in the user data repository 152). The detection of user accounts can be made in a variety of ways. In one embodiment, users choose to provide the electronic catalog system 110 with access to their data associated with a content site 120. For example, users can provide the electronic catalog system 110 with information about which content sites 120 they have accounts with. The users can further provide their user names, links to a content site page they have made, or other account information. In one embodiment, the users therefore opt-in to a recommendation service by providing their identity information to the data collector 160. The data collector 160 can use this identity information to obtain conversation data using techniques that will be described below.

In another embodiment, the electronic catalog system 110 includes a conversation tracking application (not shown) or the like that can be accessed through a content site 120. On the Facebook™ social networking site, for instance, the conversation tracking application can be a Facebook™ application that users access or otherwise use. The conversation tracking application can be hosted on the servers of the electronic catalog system 110 or on the content site's 120 servers. In one embodiment, the conversation tracking application is a widget or the like accessible from the content site 120. When a content site 120 user registers with the conversation tracking application, the application can provide at least some of the user's account information to the data collector 160. The data collector 160 can then associate the user's content site 120 account information with the user's electronic catalog system 110 account information.

In yet another embodiment, the data collector 160 can programmatically search content sites 120 for information about users. For example, the data collector 160 can use web crawling or web scraping technology to obtain user information from content sites 120. This user information can include screen names, for example, among other account information. The data collector 160 can then automatically associate the content site 120 user information with user accounts on the electronic catalog system 110. In one embodiment, the data collector 160 also requests that users of the electronic catalog system 110 confirm that the obtained user content site 120 information corresponds to them. The data collector 160 can also explain that associating the account information from the content site 120 can cause the user to obtain better product recommendations. The user can choose whether to confirm the account information so as to opt-in or opt-out as desired.

At block 204, users participate in conversations on the content site 120. As described above, conversations can include textual comments, audio/visual material, and so forth. At block 206, conversation data is collected from the content site. The conversation data can be collected in a variety of ways. In the example embodiment described above where a conversation tracking application is used, the conversation tracking application can obtain the conversation data. The conversation tracking application can obtain this data by accessing an application programming interface (API) of a content site 120. For example, the API can be a web service API or the like. The conversation tracking application can then pass this data to the data collector 160.

Alternatively, if a conversation tracking application is not provided on the content site 120, the data collector 160 can access the API instead.

Although conversation data collection has been described in the context of content sites 120, in some implementations, the data collector 160 can collect conversation data from other sources. For instance, the data collector 160 can collect conversation data from email, instant messaging conversations, text messages, Voice over IP (VoIP) telephony conversations, internet chat rooms (e.g., such as may be found on Internet Relay Chat or the like), or from a variety of other electronic sources. Conversation data collected from these sources can also be used to identify virtual item selections in order to improve recommendations.

Figure 3:
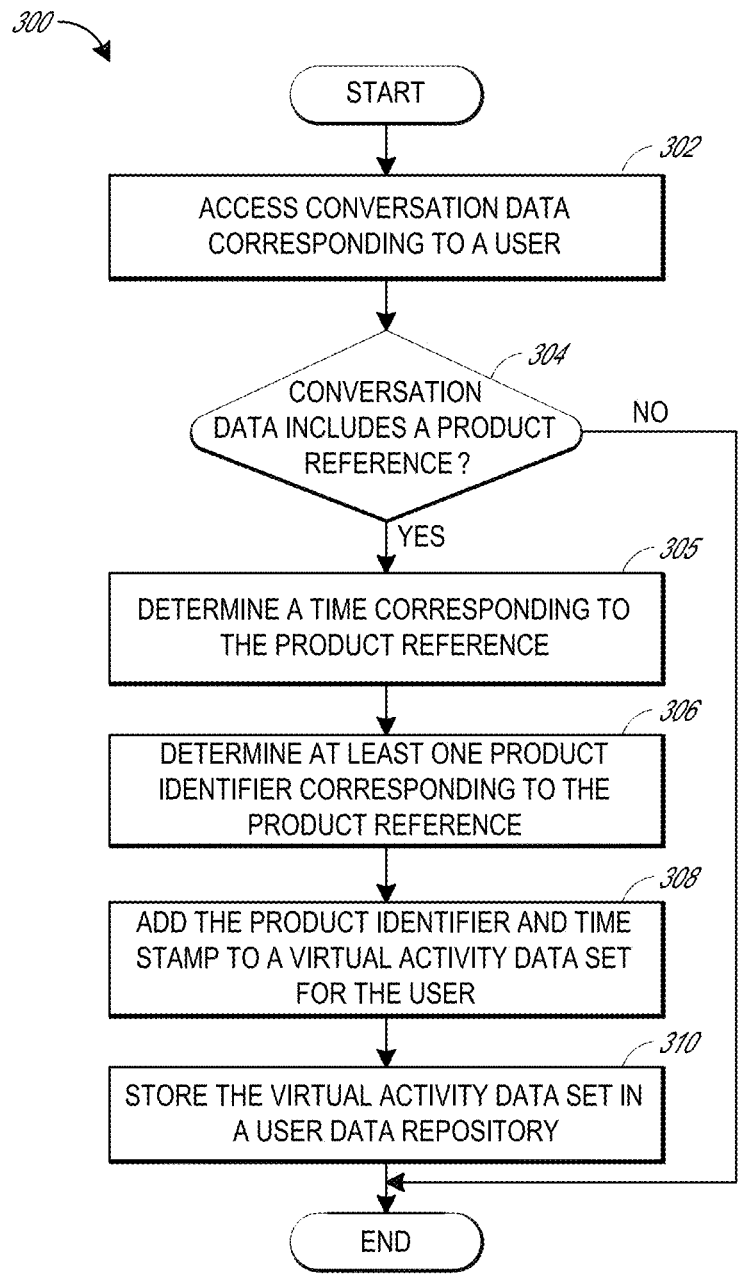
FIG. 3 illustrates an embodiment of a process for mining the conversation data to obtain information about user interests.

FIG. 3 depicts an embodiment of a conversation mining process 300 for inferring user interests from the conversation data. The conversation mining process 300 can be implemented by the electronic catalog system 110. For example, the user data mining module 150 can implement the conversation mining process 300. Advantageously, in certain embodiments, the conversation mining process 300 can identify a user's virtual item selections.

At block 302, conversation data corresponding to a user is accessed, for example, from computer storage. It is determined at decision block 304 whether the conversation data includes a product reference. The mining module 150 can detect a variety of types of product references using natural language processing techniques or other data mining techniques. A product reference can include, for example, a hypertext link that refers to a product, a mention of a specific product name (e.g., a brand name or a generic product name), or a product number (such as an ISBN, SKU number, a stock number, or the like). A product reference can be made by a first user, by another user conversing with the first user (such as a friend), or by another user who has some association or relationship with the first user.

In certain embodiments, product references can be identified that are associated with some interest shown on the part of a user. Natural language processing techniques can be used to determine whether an interest was shown. For example, a user might write that he would "like to buy" or "would love to have" a certain product. The mining module 150 can detect these and other such phrases used in proximity with a product reference to determine whether interest was shown. Conversely, if a user states that he "hates product x" or uses some other disparaging terminology, the mining module 150 might not consider the user to have interest in a product. Thus, in certain embodiments, product references are identified only when users manifest some interest in the product. In other embodiments, all product references are identified. For example, conversation data can further include references to products that a user owns. A user might state, for instance, that the user "recently bought product x." The mining module 150 can identify such statements as virtual purchase history for a user.

Product references made by users or by others who are part of a conversation can be considered to be virtual clicks or, more generally, virtual item selections. While a user may not have actually clicked on or selected an item, the electronic catalog system 110 can advantageously treat the product reference as an item selection in certain embodiments. Thus, in certain embodiments, these virtual item selections can be used as virtual or simulated activity data.

In one embodiment, product references that include a link to a product or product numbers are considered virtual item selections, whereas other product references that make more general reference to products are considered potential item selections. These distinctions can be used by the recommendation service 180 to prioritize or weight item recommendations (see FIGS. 4A and 4B). In other embodiments, all product references are considered to be virtual item selections, and no distinction is made between different types of product references when generating recommendations.

Figure 5:
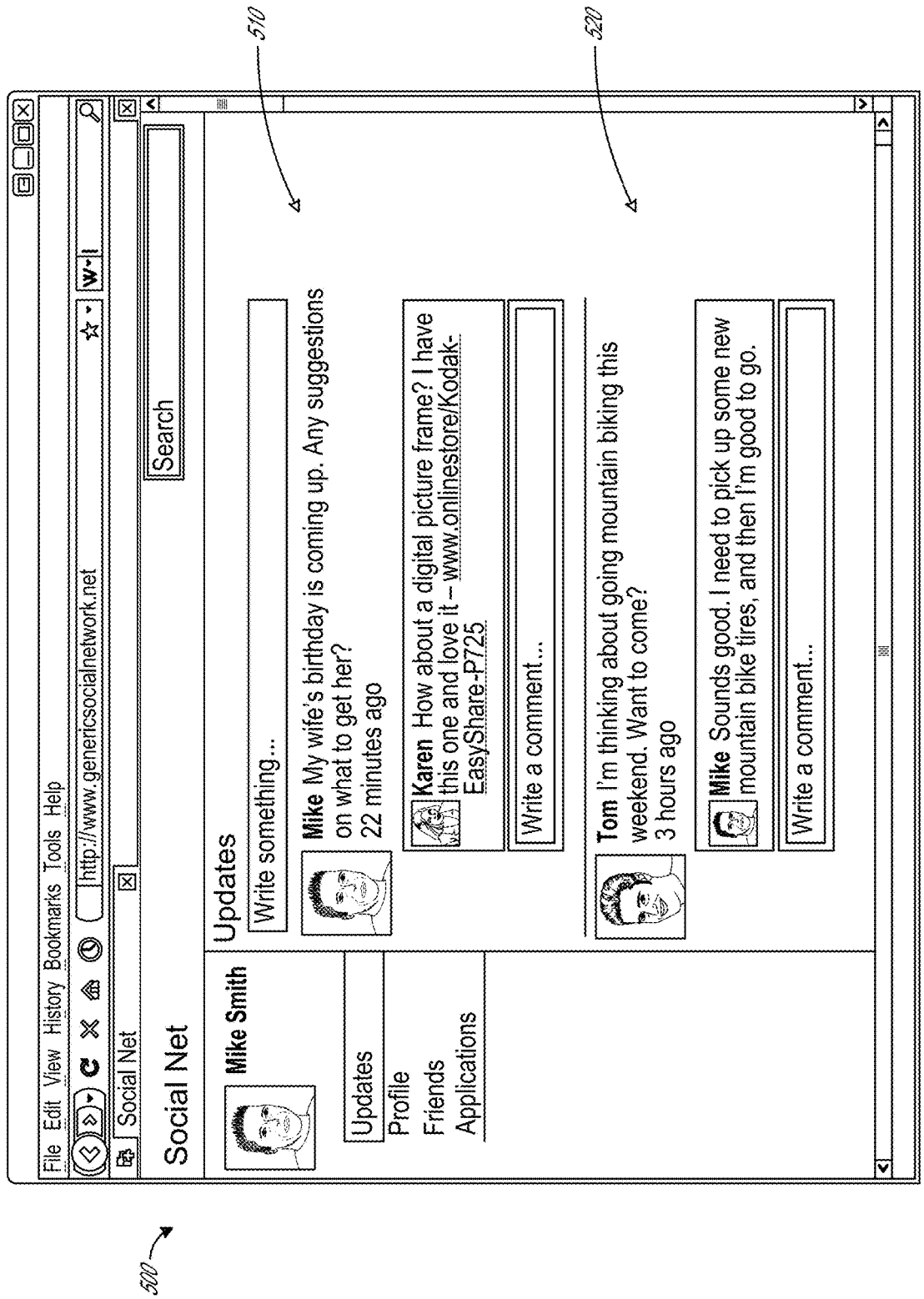
FIG. 5 illustrates an embodiment of a user interface depicting example user conversations on a content site.

FIG. 5 illustrates an embodiment of a content site user interface 500 that includes example product references. The user interface 500 is shown in a browser; however, applications other than browsers can be used to access the user interface 500 in some embodiments. In the user interface 500, a user named "Mike" has conversations 510, 520 with other users ("Karen" and "Tom"). In the conversation 510 with Karen, Karen mentions a product—a digital picture frame. The phrase "digital picture frame" can be considered a product reference. Moreover, Karen provides a link to a specific digital picture frame—a Kodak Easy Share P725. This link can also be considered to be a product reference. In the conversation 520 with Tom, Mike mentions that he "needs to pick up some new mountain bike tires." The phrase "mountain bike tires" is another example product reference. In one embodiment, the link to the specific digital picture frame can be considered to be a virtual item selection, whereas the phrase "mountain bike tires" can be considered a potential item selection. As mentioned above, such a distinction is not made in some implementations. Rather, both the link and the "mountain bike tires" reference can be considered virtual item selections.

Referring again to FIG. 3, if it was determined at decision block 304 that the conversation data includes a product reference, then the conversation mining process 300 proceeds to block 305. Otherwise, the conversation mining process 300 ends. At block 305, a time corresponding to the product reference is determined from the conversation data. The time can be a time stamp or the like that indicates when or approximately when the product reference was made. The determined time can be used by the recommendation service 180 when weighting, ranking, or otherwise determining the relevancy of recommendations (see FIGS. 4A and 4B).

At block 306, at least one product identifier is determined that corresponds to the product reference. If the product reference includes a product number (such as a SKU number) that is recognized by the electronic catalog system 110, the mining module 150 may set the product identifier to be the same as the product number. If the product reference includes a phrase (such as "mountain bike tires"), the mining module 150 can use this phrase as the product identifier.

In another embodiment, the mining module 150 looks up the product reference in the search engine 140 to find one or more products in the electronic catalog that correspond to the product reference. For example, for the conversation 520 of FIG. 5 that mentions "mountain bike tires," the mining module 150 can look up the phrase "mountain bike tires" in the search engine 140. The mining module 150 can then select one or more of the search results and determine the product numbers corresponding to these results. The one or more product numbers can be used as the product identifier or identifiers.

The product identifier(s) and time stamp are added to a virtual activity data set for the user at block 308. In one embodiment, the virtual activity data can include both virtual item selections and virtual item purchases, as described above. The mining module 150 can store the virtual activity data set in the user data repository 152 at block 310. The conversation mining process 300 can loop for multiple product references before ending.

Although not shown, in certain embodiments, the conversation mining process 300 also mines for general topics discussed by users. The mining module 150 can store phrases corresponding to these general topics (such as "basketball" or "computers") as product identifiers in the virtual activity data set. As will be described in greater detail below, the recommendation service 180 can also use this information to generate recommendations.

IV. Recommendations

Figure 4A:
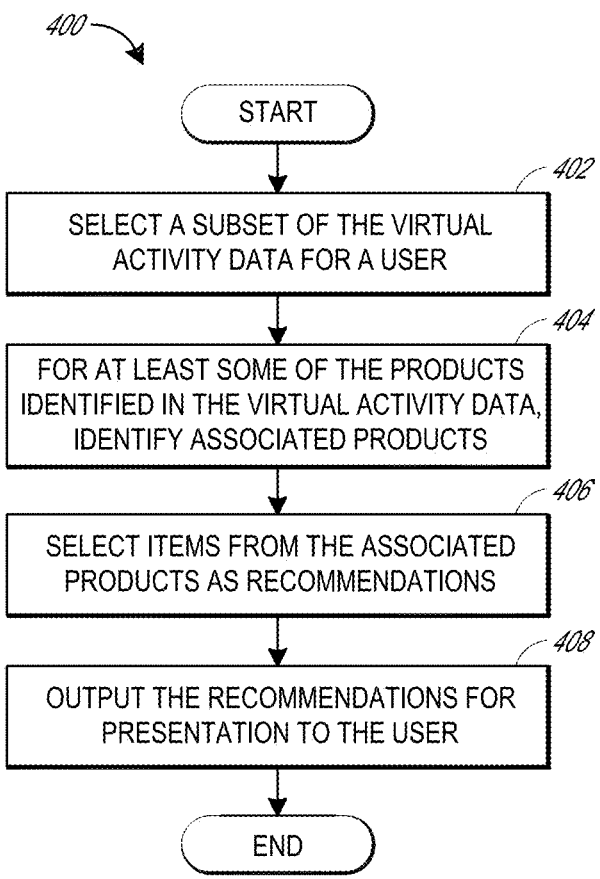
FIGS. 4A and 4B illustrate embodiments of processes for selecting recommendations based at least in part on the mined conversation data.
Figure 4B:
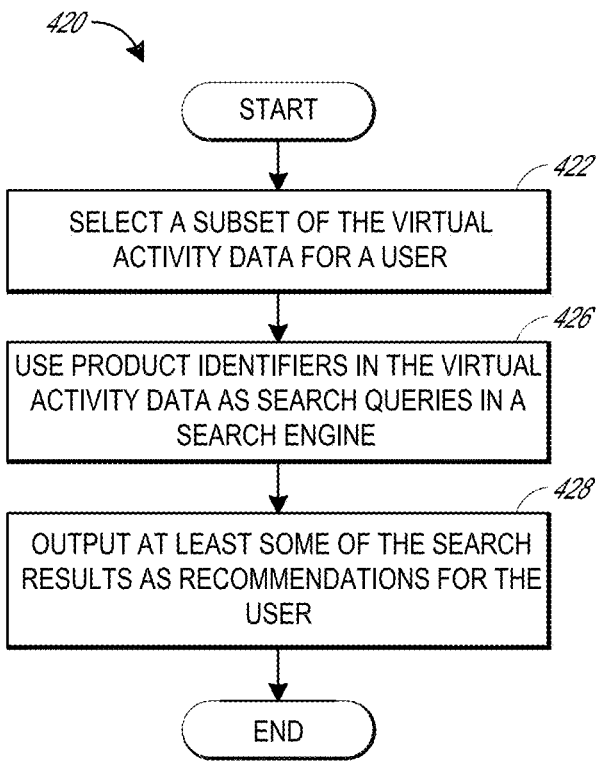

FIGS. 4A and 4B depict embodiments of recommendation processes 400, 420 for selecting recommendations based at least in part on virtual activity data. The recommendation processes 400, 420 can be implemented by the electronic catalog system 110. For example, the recommendation service 180 can implement the recommendation processes 400, 420. Advantageously, in certain embodiments, the recommendation processes 400, 420 can use virtual activity data instead of or in addition to catalog activity data to generate personalized recommendations.

Referring specifically to FIG. 4A, the recommendation process 400 illustrates one possible recommendation algorithm that can use virtual activity data. At block 402, a subset of the virtual activity data for a user is accessed, for example, from the user data repository 152. In one embodiment, this subset is selected according to the time stamps associated with product identifiers in the virtual activity data. More recent time-stamped product identifiers can be selected to obtain recommendations that represent more current interests for a user.

At block 404, for at least some of the products identified in the virtual activity data, associated products are identified from an associations data set previously generated by the item data mining component 170. The item data mining component 170 can generate the associations data set in a separate process by detecting behavioral associations between items. For example, the item data mining component 170 can assign associations between items that users frequently viewed together or bought together.

Items that users frequently viewed together (e.g., in the same browsing session) can be considered to be substitutable for one another. For example, users tend to shop for a certain type of item at a time, such as a digital camera. Digital cameras that a user views within a browse session can be considered substitutable in a recommendations process. In one embodiment, the item data mining component 170 creates a substitution data set including these associations. In contrast, items that users frequently purchased together can be assigned complementary associations, reflecting that these items tend to complement each other. For example, user tend not to buy two different digital cameras, but a digital camera and a complementary case.

The item data mining component 170 can use various techniques to detect behavioral associations between items. For example, the item data mining component 170 can use any of the association detection techniques described in U.S. Publication No. 2002/0019763, filed Mar. 29, 2001, titled "Use of product viewing histories of users to identify related products," or U.S. application Ser. No. 12/354,233, filed Jan. 15, 2009, titled "System for detecting probabilistic associations between items," the disclosures of which are hereby incorporated by reference in their entirety.

In one embodiment, the mining component 170 stores detected item-to-item associations, represented by scores or the like, in an associations table or other data structure. Thus, when the recommendation service 180 can look up products identified in the virtual activity data in an associations table to find associated products. In one embodiment, the recommendation service 180 looks up virtual item browsing selections in a substitutions association data set and virtual item purchases in a complementary data set to find appropriate recommendations.

At block 406, items are selected from the associated products as recommendations. The recommendations can include the most-highly scored associated items. The scores for the recommendations can be derived from the scores stored in the association table. This association score can further be weighted to readjust the recommendation scores. For instance, virtual item selections can be weighted higher than potential item selections because conversations that mention a product link can indicate higher user interest than conversations that merely mention a general product. The weighting for a given virtual item selection can be multiplied by an association score to arrive at a recommendation score. At block 408, the recommendations are output for presentation to the user.

When catalog activity data is present for a user, the recommendation service 180 can use both the catalog and virtual activity data to generate recommendations. If the catalog activity data includes time stamped data, for instance, the recommendation service 180 can combine items represented in the catalog and virtual activity data and sort the items by time stamp. Thus, at block 402, the subset of items selected from this combined data can be the most recent items actually or virtually selected. Additionally, when both catalog and virtual activity data are used to recommend items, items represented in the catalog activity data can be weighted higher than items represented in the virtual catalog data when scoring recommendations. However, catalog and virtual activity data can be weighted equally in other embodiments.

Referring to FIG. 4B, another possible recommendation process 422 is illustrated that can use virtual activity data. In particular, in certain embodiments, the recommendation process 422 can be used for the potential item selections described above with respect to FIG. 3.

At block 422, a subset of the virtual activity data for a user is selected. Block 422 can proceed in a similar fashion as block 402 of the recommendation process 400, selecting the most recent products identified in the virtual activity data.

At block 424, product identifiers in the virtual activity data are used as search queries in a search engine (e.g., the search engine 140). As described above, product identifiers for potential item selections can include a product phrase (such as "mountain bike tires"). Thus, searching for the product phrase can result in search results that may be interesting to a user. At block 428, at least some of the search results are output as recommendations for the user.

It should be noted that many other recommendation algorithms can use virtual activity data. For instance, one recommendation algorithm can simply output the items identified in the virtual activity data as recommendations. Another recommendation algorithm can identify a browse node in the electronic catalog with which an item in the virtual activity data is associated. The recommendation algorithm can then recommend other items in this browse node to the user. Another recommendation algorithm can be a rule-based algorithm that uses at least some human input to generate recommendation rules. The rule-based algorithm can apply one or more rules to the items in the virtual activity data, such as "users who virtually selected apple pie should be recommended vanilla ice cream."

Further, any recommendation algorithm can output one or more descriptive messages that can identify the reasons or sources of the recommendation. For instance, a recommendation algorithm might output a descriptive message such as, "Recommended for you because your friend Karen on Facebook suggested this item." Other examples of descriptive messages can be output with recommendations are described in U.S. application Ser. No. 11/752,251, filed May 22, 2007, titled "Probabilistic recommendation system," the disclosure of which is hereby incorporated by reference in its entirety.

Other applications can also consume virtual activity data. For example, the electronic catalog system 110 can provide a widget that dynamically updates to show the most recent item or items in the user's virtual activity data. Many other uses for virtual activity data are also possible. In addition, it should be noted that recommendations can be output for presentation on a page (e.g., a web page) of the electronic catalog system 110, on a page, widget, or application of the content site 120, in an email, or in any other communication to the user. Likewise, the recommendations can be output by an application (e.g., a social networking application) running on any form of user device, including mobile devices.

V. Terminology

Depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for generating personalized recommendations of catalog items, the system comprising one or more computing devices configured to implement:

a server system that hosts a first site that provides interactive user access to an electronic catalog, wherein the server system stores data that links a first account of a user with a second account of the user, the first account being with the first site, the second account being with a second site that is separate from the first site, the second site including functionality for users to engage in conversations in which users post messages for viewing by other users, wherein the server system uses account information submitted by the user for the second account to access conversations of the user on the second site, and uses a conversation mining component to mine said conversations for references to catalog items, wherein the conversation mining component is configured to identify a reference to a first catalog item in a conversation at least partly by detecting that text of the conversation comprises a hypertext link that references the first catalog item;

a data repository that stores, in association with the user, a record of (1) a first set of one or more catalog items selected by the user from the electronic catalog on the first site, and (2) a second set of one or more catalog items referenced in one or more conversations of the user on the second site, said second set identified by the conversation mining component, the one or more conversations comprising textual message content posted to the second site by the user; and a recommendation service configured to use the first and second sets of catalog items as source items for selecting additional catalog items to recommend to the user.

2. The system of claim 1, wherein the server system is configured to generate, and transmit to a user device of the user in response to a page request, a personalized page that includes a representation of the additional catalog items selected to recommend, the personalized page including, for each additional catalog item selected to recommend, a respective link to a product information page of the additional electronic catalog item, the product information page corresponding to, and including a description of, the respective additional catalog item, said links being selectable to navigate from the personalized page to the product information pages.

3. The system of claim 1, further comprising the conversation mining component.

4. The system of claim 3, wherein the conversation mining component is configured to analyze textual message content submitted by the user in association with a reference to a first catalog item to determine whether the user expressed an interest in the first catalog item.

5. The system of claim 4, wherein the conversation mining component is configured to analyze the textual message content at least partly by searching the textual message content for predetermined phrases.

6. The system of claim 1, wherein the server system retrieves message content of conversations on the second site using an application programming interface of the second site.

7. The system of claim 1, wherein the second site is a social networking site.

8. The system of claim 1, wherein the server system is configured to link the first account to the second account using the account data submitted by the user for the second account.

9. A method of generating personalized item recommendations based on user activity across multiple sites, comprising, by a computer system comprising computer hardware:

creating an association between first and second accounts of a user, wherein the first account is with a first site that hosts an electronic catalog, and the second account is with a second site that provides an electronic forum for conversations between users, wherein the association is created using account information supplied by the user for the second account;

retrieving text of a conversation on the second site between the user and one or more other users, wherein the text of the conversation is retrieved through an application programming interface of the second site using said account information for the second account;

determining that a first catalog item is referenced in the retrieved text of the conversation, wherein determining that the first catalog item is referenced in the retrieved text of said conversation comprises detecting that the retrieved text comprises a hypertext link that references the first catalog item;

identifying a second catalog item selected by the user from the electronic catalog;

by execution of a recommendation algorithm, selecting additional catalog items to recommend to the user based at least in part on the first catalog item and the second catalog item, to thereby generate personalized recommendations that are dependent on actions of the user on the first site and the second site; and generating, and transmitting to a user device of the user in response to a page request, a personalized page that includes a representation of the additional catalog items, the personalized page including, for each additional catalog item selected to recommend, a respective link to a product information page of the electronic catalog, the product information page corresponding to, and including a description of, the respective additional catalog item, said links being selectable to navigate from the personalized page to the product information page.

10. The method of claim 9, wherein the retrieved text comprises a reference to the first catalog item, and the method further comprises analyzing text associated with the reference to assess whether the user has an interest in the first catalog item.

11. The method of claim 10, wherein analyzing the text associated with the reference comprises searching for pre-determined phrases.

12. The method of claim 9, wherein the second site is a social networking site.

13. The method of claim 11, wherein the pre-determined phrases include at least one phrase indicating a desire of the user to obtain the first catalog item.

14. A system configured to provide catalog item recommendations to users based on user activity across multiple sites, the system comprising one or more computing devices configured to implement:

a data repository that stores account association data that associates a first account of a user with a second account of the user, wherein the first account is with a first site that hosts an electronic catalog, and the second account is with a second site that provides an electronic forum for conversations between users;

a data repository that stores a record of a set of one or more catalog items selected by the user from the electronic catalog;

a data collection component that uses account data associated with the second account to retrieve text of one or more conversations on the second site between the user and one or more other users;

a conversation mining component that searches the retrieved text for references to catalog items at least partly by searching for hypertext links containing references to catalog items; and a recommendation system that selects additional catalog items to recommend to the user based on at least (1) the one or more catalog items selected by the user from the electronic catalog, and (2) one or more items identified by the conversation mining component as being referenced in the one or more conversations.

15. The system of claim 14, further comprising a server configured to generate, and transmit to a user device of the user in response to a page request, a personalized page that includes a representation of the additional catalog items selected to recommend, the personalized page including, for each additional catalog item selected to recommend, a respective link to a product information page of the electronic catalog, the product information page corresponding to, and including a description of, the respective additional catalog item, said links being selectable to navigate from the personalized page to the product information pages.

16. The system of claim 14, wherein the conversation mining component is configured to analyze textual message content submitted by the user in association with a reference to a catalog item to determine whether the user expressed an interest in the catalog item.

17. The system of claim 16, wherein the conversation mining component is configured to analyze the textual message content at least partly by searching the textual message content for predetermined phrases.

18. The system of claim 14, wherein the data collection component uses an application programming interface of the second site to retrieve the text of the one or more conversations.

* * * * *